(12) United States Patent
Oyama et al.

(10) Patent No.: US 7,541,742 B2
(45) Date of Patent: *Jun. 2, 2009

(54) COLORED GLASS FOR LIGHTING, COLORED GLASS BULB AND METHOD FOR PRODUCING THEREOF

(75) Inventors: Hideki Oyama, Fukushima (JP); Yukio Takagi, Otsu (JP)

(73) Assignees: Maeda Kogyo Co., Ltd., Tokyo (JP); Nippon Electric Glass Co., Ltd., Shiga (JP)

( * ) Notice: Subject to any disclaimer, the term of this patent is extended or adjusted under 35 U.S.C. 154(b) by 311 days.

This patent is subject to a terminal disclaimer.

(21) Appl. No.: 11/290,445

(22) Filed: Dec. 1, 2005

(65) Prior Publication Data

US 2006/0084562 A1 Apr. 20, 2006

Related U.S. Application Data

(62) Division of application No. 09/963,593, filed on Sep. 27, 2001, now Pat. No. 7,049,255.

(30) Foreign Application Priority Data

Sep. 29, 2000 (JP) .............................. 2000-298903

(51) Int. Cl.
*H01J 61/30* (2006.01)
*H01J 17/16* (2006.01)
*C03C 3/087* (2006.01)

(52) U.S. Cl. ........................................ 313/636; 501/70

(58) Field of Classification Search .................... 501/54, 501/64–66, 69, 70, 72, 73, 77, 78; 313/480, 313/493, 636; 445/22, 25, 27; 65/63
See application file for complete search history.

(56) References Cited

U.S. PATENT DOCUMENTS

| 4,792,536 | A | 12/1988 | Pecoraro et al. |
|---|---|---|---|
| 4,867,779 | A | 9/1989 | Meunier et al. |
| 5,010,041 | A | 4/1991 | Koyama et al. |
| 5,885,915 | A | 3/1999 | Bako et al. |
| 5,925,582 | A | 7/1999 | Filmer et al. |
| 5,958,811 | A | 9/1999 | Sakaguchi et al. |
| 6,017,838 | A | 1/2000 | Marlor |
| 6,469,443 | B1 | 10/2002 | Bryant et al. |
| 6,744,207 | B2 | 6/2004 | Ulenaers et al. |
| 7,049,255 | B2 * | 5/2006 | Oyama et al. .................. 501/64 |
| 2002/0117950 | A1 | 8/2002 | Ulenaers et al. |

FOREIGN PATENT DOCUMENTS

| DE | 4231794 A1 | 3/1994 |
|---|---|---|
| JP | 5836944 | 3/1983 |
| JP | 09194230 | 7/1997 |
| RU | 2044708 C1 | 9/1995 |
| SU | 1682333 A1 | 10/1991 |

OTHER PUBLICATIONS

European Search Report dated Nov. 30, 2001.

* cited by examiner

*Primary Examiner*—Karl E Group
*Assistant Examiner*—Elizabeth A Bolden
(74) *Attorney, Agent, or Firm*—Dickinson Wright, PLLC

(57) ABSTRACT

The present invention provides colored glass containing no hazardous substances, such as CdS, CdSe and $PbCrO_4$, and used for lamps and covers for lighting, a colored glass bulb with yellow to orange color produced by using said colored glass, and a method for producing said colored glass and said colored glass bulb. Glass composition having a formula of $R'_2O$—$RO$—$SiO_2$ (wherein R' is an alkali metal element and R is an alkaline earth metal element) is added with 0.01-0.6 of weight ratio of Mo (molybdenum) as $MoO_3$ and 0.01-1.0 of weight ratio of S to obtain the colored glass and the colored glass bulb therefrom. The colored glass having a formula of $R'_2O$—$RO$—$SiO_2$ is formed to a desired shape to obtain the colored glass bulb, and the shaped hollow article is heated to 400-620° C. to apply a coloring treatment thereto.

3 Claims, No Drawings

COLORED GLASS FOR LIGHTING, COLORED GLASS BULB AND METHOD FOR PRODUCING THEREOF

This is a divisional of application Ser. No. 09/963,593 filed Sep. 27, 2001.

BACKGROUND OF THE INVENTION

The present invention relates to a colored glass in yellow to orange color used for a lamp or a cover for lighting, particularly for a turn signal lamp and a cover for fog lamps of automobiles, a colored glass bulb produced with said colored glass, and a method for producing the colored glass bulb.

Presently, a colored glass in yellow to orange color being used in an industrial scale is generally a glass produced by adding CdS (cadmium sulfide) or CdSe (cadmium selenide) as a colorant into $R'_2O$—RO—$SiO_2$ glass, wherein R' is an alkali metal and R is an alkaline earth metal. Usually, colored glass for lamps and covers for lighting includes the colored glass produced as described above.

Also, a colored glass for lamps and covers for lighting is obtained by applying a coating with yellow to orange color on a surface of a clear glass. In this case, PbO—$B_2O_3$—$SiO_2$ glass is added with $Cr_2O_3$ (chromium sesquioxide) or $K_2CrO_4$ (potassium chromate), and used as a coating agent of a glass having a low melting point colored with $PbCrO_4$ (lead chromate). Also, silicone is added with a pigment of CdS, CdSe, $PbCrO_4$, etc., or with $Fe_2O_3$ (ferric oxide) and an organic pigment etc., and used as coating agent.

Use of colorants and pigments such as CdS, CdSe, $PbCrO_4$, etc. added to glasses and coating agents as described above are legally prohibited in many countries due to their extremely strong toxicity.

Organic coating agents containing, for example, silicone as described above have weak cohesion strength to glasses, and the coating with such organic coating agent tends to be easily exfoliated. Also such coating has problem in the thermal resistance, namely temperature limitation in the use, as a result of the loss of color or cracking of the coating occurs in some case.

SUMMARY OF THE INVENTION

In view of the above circumstances, it is an object of the present invention to provide a colored glass for lighting, which does not contain CdS, CdSe, $PbCrO_4$, etc., is safe in view of environmental pollution, and is used for lamps and covers for lighting having no problem in thermal resistance, and particularly for turn signal lamp and covers for fog lamps for automobiles. Also, it is an object of the present invention to provide a colored glass bulb for lighting with yellow to orange color using the colored glass described above, and a method for producing said colored glass and said colored glass bulb.

The present invention is directed to a colored glass for lighting having a formula of $R'_2O$—RO—$SiO_2$ (or a colored glass for lighting having system of $R'_2O$—RO—$SiO_2$) wherein R' is an alkali metal element and R is an alkaline earth metal element, characterized by adding 0.01-0.6 of weight ratio of Mo (molybdenum) as $MoO_3$ (molybdenum trioxide) and 0.01-1.0 of weight ratio of S (sulfur).

Preferably, 0.05-0.6 of weight ratio of Mo (molybdenum) as $MoO_3$ (molybdenum trioxide) and 0.02-0.75 of weight ratio S (sulfur) are added.

The colored glass may further contain $TiO_2$ (titanium dioxide).

The colored glass may further contain $TiO_2$ and a rare earth oxide. The rare earth metal is at least one selected from $La_2O_3$ (lanthanum oxide) and $Nd_2O_3$ (neodymium oxide).

The other aspect of the present invention provides a method for producing a colored glass bulb for lighting, comprising forming a colored glass having a formula of $R'_2O$—RO—$SiO_2$ (wherein R' is an alkali metal element and R is an alkaline earth metal element) added with 0.01-0.6 of weight ratio of Mo (molybdenum) as $MoO_3$ (molybdenum trioxide) and 0.01-1.0 of weight ratio of S (sulfur), to a desired shape, and heating the shaped hollow article to 400-620° C. to apply a coloring treatment thereto.

Preferably, said heating in the coloring treatment is carried out at a temperature of from 450 to 580° C. during a period of within 1 hour.

The colored glass bulb for lighting produced by the above described method is used for a turn signal lamp and a cover for a fog lamp of automobiles.

PREFERRED EMBODIMENT OF THE INVENTION

The colored glass for lighting according to the present invention is a glass composition having a formula of $R'_2O$—RO—$SiO_2$, wherein 0.01-0.6 by weight of Mo on the converted basis to $MoO_3$ or 0.01-0.6 by weight of Mo expressed as $MoO_3$ and 0.01-1.0 by weight of S are added. Said colored glass itself has a color so that it can be used as it is. However, if the glass is applied to a coloring treatment as described later, it can be processed to more clear and desired colored glass with yellow to orange.

The glass of the formula of $R'_2O$—RO—$SiO_2$ or the glass of system of $R'_2O$—RO—$SiO_2$ has been conventionally used for lamps and covers for lighting. If the glass has desired properties including good workability, good insulation property, good sealing property with dumet wires and the like, any glass having the formula of $R'_2O$—RO—$SiO_2$ can be used, although some difference in coloring performance between the different basic glass compositions may be given.

$R'_2O$ in the formula of $R'_2O$—RO—$SiO_2$, is an alkali metal oxide such as $Li_2O$ (lithium oxide), $Na_2O$ (sodium oxide), $K_2O$ (potassium oxide) and the like, and the mixture of two or more oxides described above may be used as well.

RO in the formula of $R'_2O$—RO—$SiO_2$, is an alkaline earth metal oxide such as MgO (magnesium oxide), CaO (calcium oxide), SrO (strontium oxide), BaO (barium oxide) and the like, and the mixture of two or more oxides may be used as well.

Mo and S are essential components as the colorant in the present invention. When any one of these components is absent, it is not possible to obtain the desirably colored glass with yellow to orange color. Although a glass with yellowish color is obtainable when only S is added, such coloring in the yellowish glass is far loss compared to the colored glass of the present invention, and thus such yellowish glass is not suitable for lamps and covers for lighting, particularly for lamps for lighting used for turn signal lump and covers for fog lamps of automobiles, etc.

Mo and S may be added in the either form of simple substance or compound thereof, to obtain the desirable color of yellow to orange.

Relating to raw material for Mo, the simple substance of metal Mo (metal molybdenum) and the molybdic compound such as $MoO_3$ (molybdenum trioxide), $MoS_2$ (molybdenum disulfide) and the like may be used. Irrespective of the type of the raw material for Mo to be used, 0.01-0.6 of weight ratio of Mo on the converted basis to $MoO_3$ (molybdenum trioxide) (0.01-0.6 of weight ratio of Mo expressed as $MoO_3$) should be added.

Relating to the raw material for S, the simple substance of S (flower of sulfur) and the sulfuric compounds such as $Na_2S$ (sodium sulfide), $K_2S$ (potassium sulfide) and the like may be used.

It should be avoided to add the excess amount of Mo and S, because the addition in the excess amount may cause the formation and precipitation of black crystals of Mo—S in the glass to thereby disturb a desired coloring and light transparency in the glass.

<Example for the Method for Producing the Colored Glass for Lighting>

According to the present invention, the colored glass for lighting is obtained by adding a predetermined amount of Mo (molybdenum) and S (sulfur) into a batch of glass of the formula of $R'_2O$—RO—$SiO_2$, and then fusing them to obtain the colored glass.

Further, in the present invention, rare earth oxide or the like containing at least one selected from $TiO_2$, $La_2O_3$, $Nd_2O_3$ and the like may be further added into the glass of the formula of $R'_2O$—RO—$SiO_2$ as colorant in addition to Mo and S. Owing to the addition of the rare earth oxide, particularly the addition of $La_2O_3$ or $Nd_2O_3$, the colored glass with dense and clear orange color may be easily obtained. In this case, the additional quantity of $TiO_2$ or the rare earth oxide may be appropriately selected in view of the amount of Mo to be added to the glass of $R'_2O$—RO—$SiO_2$. When the weight ratio of Mo is 0.10 or less and the weight ratio of S is 0.1 or less, the weight ratio of $TiO_2$ may be about 4.0. When the weight ratio of Mo is 0.15 or less, the weight of ratio of S is 0.1 or less and the weight ratio of $TiO_2$ is 1.0 or less, the weight ratio of $La_2O_3$, $Nd_2O_3$ and the like may be about 12.0. However, please note that it is not preferable to add the rare earth oxide too much, because it makes the production cost high.

<Method for Producing Colored Glass Bulb for Lighting>

Now, the following is an explanation of the method for producing the colored glass bulb for lighting from the above described colored glass. The glass bulb can be produced by forming a glass tube from the colored glass, and then forming the glass bulb from the glass tube, like the conventional method.

<Making the Glass Tubes>

A batch of glass added with Mo and S is melted so as to prepare the composition of the colored glass as described above, then the glass tube is made from the melted colored glass by stretching the melted glass using, a conventional drawing process, such as a hand drawing and a down drawing etc.

<Processing and Making Shape of Glass Bulb>

The glass tubes obtained above are heated by a burner, and then formed into glass bulb having a desired shape according to the conventional method such as blowing.

<Coloring Treatment>

In the process to produce the colored glass for lighting of the present invention, the coloring owing to Mo—S tends to be enhanced, when the colored glass is subjected to heating at a certain temperature range, in comparison with the case that the colored glass is melted and then immediately cooled. Therefore, if necessary, the coloring treatment may be applied to the colored glass or the colored glass bulb formed as described above, so as to give a desired color. The coloring is performed by using a batch-type or continuation-type electric furnace at 400-620° C. for 10-300 minutes, preferably at 450-580° C. for an hour. If the temperature is lower than 400° C., longer time would be required which accordingly raising the producing cost. If the temperature is higher than 620° C., the deformation of the colored glass bulb occurs, or clear coloring is not obtainable.

The coloring treatment is effective to prevent the formation and precipitation of black crystal of Mo—S in the glass due to the addition of an excess amount of colorant, and to obtain stable colored glass or colored glass bulb for lighting, particularly the colored glass bulb used for turn signal lump of automobiles. In addition, for the producing of covers used for fog lamps of automobiles, the coloring treatment has an advantage of easily controlling the chromaticity of the colored glass.

The desired color described here, that is the color of the turn signal lamp of automobiles, is defined by the chromaticity according to the XYZ color system (CIE 1931 standard colorimetric system) established by Commission Internationale de l'Eclairage (CIE).

1. The orange (yellow red) color standardized by Economic Commission of Europe (ECE) and Japanese Industrial Standards (JIS) is as follows.
  1) $0.429 \geq y \geq 0.398$
  2) $z \leq 0.007$
  3) $x+y+z=1$ 2. Society of Automotive Engineers (SEE) has established a condition for the yellow (amber) color, and that should be within the following range.
  1) $y=0.39$
  2) $y=0.79-0.67x$
  3) $y=x-0.12$ For the yellow color used for fog lamp covers, JIS has established the standard for pale yellow color that is within the following ranges.
  1) $y \geq 0.138+0.580x$
  2) $y \leq 1.290x-0.100$
  3) $y \geq -x+0.940$
  4) $y \leq -x+0.992$
  5) $y \geq 0.440$ The SAE standard described above as the standard for orange color employed for turn signal lamps of automobiles and the like is a common standard applied in a part of North American countries. In view of uniformity of the products, ECE standard and JIS standard which are included in SAE standard are substantially employed world-wide. Thus, the colors described in the present invention are applied to ECE standard or JIS standards.

The colored glass or colored glass bulb for lighting and colored glass covers in yellow to orange color can be obtained as described above. In particular, since the colored glass bulb to be used for turn signal lamps and for fog lamp covers of automobiles, etc. are required to have a fixed chromaticity, it is required to assure the chromaticity of the colored glass and the colored glass bulb by controlling the content of Mo and S in the glass, controlling heating temperature and duration of heating for the coloring treatment, and adjusting the additional amount of the rare earth oxide, such as $TiO_2$, $La_2O_3$ and $Nd_2O_3$.

EXAMPLES

Now, the present invention is further described with referring the examples and the comparative examples.

Now, the composition and the optical property of each glass in the examples (Nos. 1-14) for the present invention and the comparative examples (Nos. 15-20) are shown in Tables 1-4.

TABLE 1

|  |  | Example 1 | Example 2 | Example 3 | Example 4 | Example 5 wt-% |
|---|---|---|---|---|---|---|
| Basic glass composition | $SiO_2$ | 68.7 | 70.2 | 67.3 | 68.7 | 68.7 |
| | $Al_2O_3$ | 1.5 | 1.8 | 3.8 | 1.5 | 1.5 |
| | $B_2O_3$ | 1.9 | 1.8 | — | 1.9 | 1.9 |
| | MgO | 1.1 | 1.0 | 1.3 | 1.1 | 1.1 |
| | CaO | 2.1 | 2.0 | 2.1 | 2.1 | 2.1 |
| | SrO | 5.9 | 5.5 | 2.2 | 5.9 | 5.9 |
| | BaO | 2.7 | 2.5 | 9.0 | 2.7 | 2.7 |
| | $Li_2O$ | 1.5 | 1.4 | 1.3 | 1.5 | 1.5 |
| | $Na_2O$ | 9.0 | 8.5 | 8.1 | 9.0 | 9.0 |
| | $K_2O$ | 5.6 | 5.3 | 4.9 | 5.6 | 5.6 |
| Colorant | $MoO_3$ | 0.15 | 0.15 | 0.15 | 0.05 | 0.10 |
| | S | 0.1 | 0.1 | 0.1 | 0.1 | 0.1 |
| | $TiO_2$ | — | — | — | — | — |
| | $La_2O_3$ | — | — | — | — | — |
| | $Nd_2O_3$ | — | — | — | — | — |
| Optical Property | color | dense yellow | yellow | dense yellow | yellow | yellow |
| | Transparency | clear | clear | clear | clear | clear |
| | Illumination ratio (%) | 75.7 | 79.4 | 71.7 | 83.2 | 77.8 |
| | Chromaticity (x, y) | 0.532 0.445 | 0.520 0.449 | 0.541 0.443 | 0.506 0.447 | 0.525 0.448 |

TABLE 2

|  |  | Example 6 | Example 7 | Example 8 | Example 9 | Example 10 wt-% |
|---|---|---|---|---|---|---|
| Basic glass composition | $SiO_2$ | 68.7 | 68.7 | 68.7 | 70.2 | 68.7 |
| | $Al_2O_3$ | 1.5 | 1.5 | 1.5 | 1.8 | 1.5 |
| | $B_2O_3$ | 1.9 | 1.9 | 1.9 | 1.8 | 1.9 |
| | MgO | 1.1 | 1.1 | 1.1 | 1.0 | 1.1 |
| | CaO | 2.1 | 2.1 | 2.1 | 2.0 | 2.1 |
| | SrO | 5.9 | 5.9 | 5.9 | 5.5 | 5.9 |
| | BaO | 2.7 | 2.7 | 2.7 | 2.5 | 2.7 |
| | $Li_2O$ | 1.5 | 1.5 | 1.5 | 1.4 | 1.5 |
| | $Na_2O$ | 9.0 | 9.0 | 9.0 | 8.5 | 9.0 |
| | $K_2O$ | 5.6 | 5.6 | 5.6 | 5.3 | 5.6 |
| Colorant | $MoO_3$ | 0.30 | 0.60 | 0.30 | 0.05 | 0.15 |
| | S | 0.1 | 0.1 | 0.2 | 0.3 | 0.1 |
| | $TiO_2$ | — | — | — | — | 1.0 |
| | $La_2O_3$ | — | — | — | — | — |
| | $Nd_2O_3$ | — | — | — | — | — |
| Optical Property | color | yellow | pale yellow | orange | dense yellow | dense yellow |
| | Transparency | clear | clear | clear | clear | clear |
| | Illumination ratio (%) | 82.1 | 86.4 | 66.1 | 73.1 | 72.3 |
| | Chromaticity (x, y) | 0.510 0.449 | 0.489 0.442 | 0.556 0.435 | 0.536 0.444 | 0.540 0.443 |

TABLE 3

|  |  | Example 11 | Example 12 | Example 13 | Example 14 | Comparative example 15 wt-% |
|---|---|---|---|---|---|---|
| Basic glass composition | $SiO_2$ | 70.1 | 70.1 | 68.7 | 68.7 | 68.7 |
| | $Al_2O_3$ | 1.5 | 1.5 | 1.5 | 1.5 | 1.5 |
| | $B_2O_3$ | — | — | 1.9 | 1.9 | 1.9 |
| | MgO | 1.1 | 1.1 | 1.1 | 1.1 | 1.1 |
| | CaO | 2.1 | 2.1 | 2.1 | 2.1 | 2.1 |
| | SrO | 6.0 | 6.0 | 5.9 | 5.9 | 5.9 |
| | BaO | 2.7 | 2.7 | 2.7 | 2.7 | 2.7 |
| | $Li_2O$ | 1.5 | 1.5 | 1.5 | 1.5 | 1.5 |
| | $Na_2O$ | 9.3 | 9.3 | 9.0 | 9.0 | 9.0 |
| | $K_2O$ | 5.7 | 5.7 | 5.6 | 5.6 | 5.6 |
| Colorant | $MoO_3$ | 0.15 | 0.15 | 0.15 | 0.15 | — |
| | S | 0.05 | 0.08 | 0.1 | 0.1 | — |
| | $TiO_2$ | 1.0 | 1.0 | 1.0 | 1.0 | — |
| | $La_2O_3$ | 3.0 | 3.0 | 3.0 | — | — |
| | $Nd_2O_3$ | — | — | — | 3.0 | — |
| Optical Property | color | pale yellow | yellow | orange | orange | no color |
| | Transparency | clear | clear | clear | clear | clear |
| | Illumination ratio (%) | 87.7 | 76.4 | 56.9 | 61.9 | 89.3 |
| | Chromaticity (x, y) | 0.479 0.431 | 0.530 0.447 | 0.574 0.420 | 0.564 0.429 | 0.450 0.407 |

TABLE 4

|  |  | Comparative Example 16 | Comparative Example 17 | Comparative Example 18 | Comparative Example 19 | Comparative Example 20 wt-% |
|---|---|---|---|---|---|---|
| Basic glass composition | $SiO_2$ | 68.7 | 68.7 | 70.2 | 70.2 | 70.2 |
| | $Al_2O_3$ | 1.5 | 1.5 | 1.8 | 1.8 | 1.8 |
| | $B_2O_3$ | 1.9 | 1.9 | 1.8 | 1.8 | 1.8 |
| | MgO | 1.1 | 1.1 | 1.0 | 1.0 | 1.0 |
| | CaO | 2.1 | 2.1 | 2.0 | 2.0 | 2.0 |
| | SrO | 5.9 | 5.9 | 5.5 | 5.5 | 5.5 |
| | BaO | 2.7 | 2.7 | 2.5 | 2.5 | 2.5 |
| | $Li_2O$ | 1.5 | 1.5 | 1.4 | 1.4 | 1.4 |
| | $Na_2O$ | 9.0 | 9.0 | 8.5 | 8.5 | 8.5 |
| | $K_2O$ | 5.6 | 5.6 | 5.3 | 5.3 | 5.3 |
| Colorant | $MoO_3$ | 0.15 | — | — | 0.30 | 0.80 |
| | S | — | 0.1 | 0.3 | 1.2 | 0.2 |
| | $TiO_2$ | — | — | — | — | — |
| | $La_2O_3$ | — | — | — | — | — |
| | $Nd_2O_3$ | — | — | — | — | — |
| Optical Property | color | no color | no color | no color (trace yellow) | black | black |
| | Transparency | clear | clear | clear | black crystals | black crystals |
| | Illumination ratio (%) | — | — | 88.6 | — | — |
| | Chromaticity (x, y) | — — | — — | 0.462 0.418 | — — | — — |

Each of the samples in Tables 1-4 was prepared as follows. The raw materials were mixed so as to be the indicated composition in the tables. The mixed materials were placed in an alumina crucible, and melted for 2 hours in an electric furnace maintained at 1,400° C. The melted glass was flown out onto a carbon plate, and annealed for several hours at 450° C. The annealed glass plate was then polished to a thickness of 0.5 mm, and the chromaticity and the illumination ratio of the polished glass plate were measured by using a luminance colorimeter (BM-5) and an illuminance meter (IM-3) both produced by Tokyo Kogaku Kikai Co., Ltd. (TOPCON CORPORATION). Each of the Illumination ratios (%) indicated in the tables is expressed in percent ratio relative to the illumination of non-colored transparent lamp.

As apparent from the Tables 1-4, all of the samples No. 1-14 were colored in yellow to orange color. The color of the samples 8, 13 and 14 were in the range of SAE standard, and particularly the samples 13 and 14 comply with the ECE standard and JIS standards. The colors of the samples 2, 4-6 and 12 were in the standard range for the yellow color according to JIS standards.

On the other hand, since the sample No. 15 of the comparative example does not contain Mo and S, it has no color. The sample No. 16 does not contain S although it contains 0.15 of weight ratio of Mo on the converted basis to $MoO_3$ relative to the whole weight of the basic glass composition, and thus it has no color. Each of the samples Nos. 17 and 18 does not contain Mo although each of them includes 0.1-0.3 of weight ratio of S relative to the whole weight of the basic glass composition, so as not to give visible color well.

Since each of the samples Nos. 19 and 20 produced the precipitation of Mo—S in black crystals in the glass, it is not adequate to use them for the colored glass bulbs. It is assumed that the precipitation of Mo—S in black crystals tends to be produced when the content of Mo or S is greater.

The conditions for the coloring in the method according to the present invention and the optical properties of the obtained colored glass bulbs are presented in Table 5 for Examples Nos. 21-30 and Comparative Example No. 31.

Each of the samples in Table 5 was prepared as follows. First, the basic glass composition comprising 70.2 wt % of $SiO_2$, 1.8 wt % of $Al_2O_3$, 1.8 wt % of $B_2O_3$, 1.0 wt % of MgO, 2.0 wt % of CaO, 5.5 wt % of SrO, 2.5 wt % of BaO, 1.4 wt % of $Li_2O$, 8.5 wt % of $Na_2O$ and 5.3 wt % of $K_2O$ was added with a colorant of 0.15 of weight ratio of $MoO_3$, 0.1 of weight ratio of S, 1.0 of weight ratio of $TiO_2$ and 3.0 of weight ratio of $La_2O_3$. The mixed materials were melted in a closed pot to form the colored glass tube (diameter: 20.0 mm, thickness: 0.82 mm).

Then, the colored glass bulbs T-20 (a form complying with JIS, diameter: 20.0 mm, thickness: 0.82 mm) used for turn signal lump of automobiles were formed by using a forming machine. Then, the formed glass bulbs are subjected to the coloring treatment using a batch-type furnace at the temperature and duration indicated in the table, so as to obtain the samples.

As apparent from the Table 5, all of the samples Nos. 21-30 were in the range of the orange color specified in the SAE standard, and particularly, the samples Nos. 22-27 and 30 were colored glass bulbs which comply with both ECE standard and JIS standards.

On the other hand, the sample No. 31 of Comparative Example, to which the coloring treatment was not applied, gave the orange color that barely satisfied the SAE standard, however, the orange color was too pale in comparison with the color obtained in the examples and the colored glass bulbs with such a pale color cannot be used for the colored glass bulb complying to ECE standard and JIS standard.

As described above, the colored glass for lighting according to the present invention has a formula of $R'_2O$—RO—$SiO_2$ which is added with 0.01-0.6 of weight ratio of Mo as $MoO_3$ and 0.01-1.0 of weight ratio of S. Although the colored glass itself can be used as it is as the colored glass for lighting, the colored glasses with various clear colors ranging from yellow to orange can be obtained by the coloring treatment under heating. Further, colored glass with desired colors suitable for turn signal lamps and fog lamp covers of automobiles, etc. can be provided by using the colored glass of the present invention.

The method for producing a colored glass bulb according to the present invention just requires to add Mo and S in a predetermined amount and to apply a coloring treatment, and other steps can be carried out by the conventional method for the glass of formula of $R'_2O$—RO—$SiO_2$. The method according to the present invention can simply and surely provide the colored glass bulbs for lighting with desired colors but no uneven coloring for turn signal lamps and fog lamp covers of automobiles, etc.

Since the colored glass and the colored glass bulb for lighting according to the present invention do not contain hazardous or toxic substances such as CdS, CdSe and $PbCrO_4$, thus there is no fear to cause environmental pollution.

TABLE 5

| | Condition | | Optical Property | |
|---|---|---|---|---|
| | Condition for Coloring | | Illumination | Chromaticity |
| Sample | Temperature (° C.) | Time (h) | ratio (%) | (x, y) |
| Example 21 | 420 | 60 | 68.0 | 0.563 0.430 |
| Example 22 | 450 | 60 | 67.2 | 0.564 0.429 |
| Example 23 | 480 | 60 | 58.9 | 0.572 0.422 |
| Example 24 | 500 | 60 | 54.3 | 0.579 0.416 |
| Example 25 | 520 | 60 | 55.2 | 0.578 0.417 |
| Example 26 | 550 | 60 | 59.5 | 0.570 0.424 |
| Example 27 | 580 | 60 | 61.4 | 0.564 0.429 |
| Example 28 | 590 | 60 | 62.1 | 0.562 0.431 |
| Example 29 | 400 | 300 | 67.3 | 0.563 0.430 |
| Example 30 | 450 | 300 | 59.5 | 0.570 0.423 |
| Comparative Example 31 | — | — | 65.7 | 0.556 0.435 |

What is claimed is:

1. A method for producing a colored glass bulb for lighting, comprising forming a colored glass having a formula of $R'_2O$—RO—$S_iO_2$ (wherein R' is an alkali metal element and R is alkaline earth metal element) added with 0.01-0.6 of weight ratio of Mo (molybdenum) as $MoO_3$ (molybdenum trioxide) and 0.01-1.0 of weight ratio of S (sulfur), to the bulb.

2. The method according to claim 1, comprising forming the colored glass to a glass tube, and forming the glass tube to the bulb.

3. The method according to claim 1, wherein coloring treatment is applied to the bulb by heating.

* * * * *